Patented June 19, 1934

1,963,108

UNITED STATES PATENT OFFICE 1,963,108

ESTERS, AND PROCESS FOR MAKING THE SAME

James H. Werntz, Wilmington, Del., assignor to E. I. du Pont de Nemours & Company, Wilmington, Del., a corporation of Delaware No Drawing. Application August 4, 1932, Serial No. 627,459

24 Claims. (Cl. 260—2)

This invention relates to new compositions of matter, and more particularly to new compositions of matter which are capable of forming both resinous and rubber-like materials; and still more particularly to new compositions of matter which result from the chemical combination of monovinylacetylene with organic acids, and to the polymers of these new compositions of matter.

This invention has as an object the production of organic carboxylic esters of 1,3 butadienol-2, $$(CH_2=C(OH)-CH=CH_2).$$

A further object of this invention is to polymerize the organic esters of butadienol. Another object of this invention is polymerization of organic esters of butadienol of resins useful as components of coating, impregnating, and molding compositions and of adhesives. A further object of this invention is polymerization of the organic esters of butadienol to rubber-like materials. A still further object of this invention is the production of organic esters of butadienol and their polymers in one operation. Other objects of the invention will become apparent from the following description of the invention.

Organic esters of 1,3-butadienol-2 are new compounds as a class. They are readily polymerized to form polymers having wide and varying properties, and capable of extensive use in the arts.

The general method of preparing these novel organic esters comprises reacting monovinylacetylene with an organic acid in the presence of a suitable catalyst.

Vinylacetylene, a hydrocarbon having the structure $$CH_2=CH-C \equiv CH,$$

has been prepared by Willstatter and Wirth (Ber., Vol. 46 p. 535 (1913)). It has been prepared according to a different method by Nieuwland (U. S. Patent No. 1,811,959), and by Calcott and Downing (U. S. patent application Serial No. 303,494, filed January 6, 1928), the polymerization of acetylene being carried out in the presence of a catalyst composed of a cuprous salt, metallic copper, a salt of a tertiary amine or ammonia, and water, and/or suitable acids. Thru the agency of this catalyst medium, acetylene is caused to react with itself to produce a number of polymers, one of which is vinylacetylene. The vinylacetylene may be readily separated and purified by fractional distillation.

The following examples which are illustrative only and which are not to be construed as limiting the scope of the invention describe preferred procedures for making the organic esters of butadienol:

*Example 1—Preparation of 1,3-butadienyl-2-acetate* 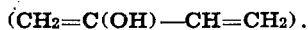

Butadienyl acetate was made by adding monovinyl acetylene to glacial acetic acid containing mercuric sulfate as a catalyst. The apparatus consisted of a one liter 3-neck flask provided with a high speed stirrer (2000–3000 R. P. M.). The blades of the stirrer were so constructed as to secure very intimate mixing of all the components of the reaction mixture. A thermometer was inserted in the rubber stopper which supported the bearing of the stirrer to record the temperature of the reaction mixture. The monovinylacetylene was placed in a calibrated dropping funnel which was jacketed with a solid carbon dioxide-acetone mixture. The exit tube of the dropping funnel extended thru one neck to the bottom of the flask and was held in position by means of a rubber stopper. A reflux condenser thru which ice water was circulated was attached to the other neck of the reaction flask by means of a rubber stopper. The reaction mixture was vented thru the reflux condenser by a tube which led into a trap cooled with a solid carbon dioxide-acetone mixture. This trap permitted collecting and measuring the monovinylacetylene which was not absorbed by the reaction mixture. The reaction flask was surrounded by an ice-salt bath after the reaction had started.

Ten grams of mercuric oxide was dissolved in 200 g. of hot glacial acetic acid and the solution was placed in the reaction flask and cooled to room temperature. Ten grams of acetic anhydride was then added to the reaction mixture and the stirrer started. To the rapidly agitated solution, four grams of fuming sulfuric acid was next added drop by drop. Mercuric sulfate was thus formed in a finely divided condition. One hundred seventy-three grams of liquid monovinylacetylene was then placed in the calibrated dropping funnel and introduced into the agitated reaction mixture. It required about 1.5 hours to add this amount. The temperature at the start of the reaction was 12° C. and was dropped to 0–5° C. in about 15 minutes by means of the ice bath where it remained thruout the experiment. Practically all the monovinylacetylene was absorbed by the reaction mixture at ice bath temperatures. The reaction mixture was poured into water saturated with salt and the ester separated as a brown oil on the surface of the water. The ester was washed with brine and distilled under reduced pressure. Thirteen grams of liquid boiling 32–70° C. at 12 mm. was obtained.

*Example 2—Preparation of 1,3-butadienyl-2-acetate* 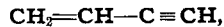

Twenty grams of mercuric oxide was dissolved in 400 grams of hot glacial acetic acid; the solution was placed in the apparatus described in Example 1 and cooled to 20° C. Twenty grams of sulfo-acetic acid was made by mixing 10 grams of fuming sulfuric acid with 10 grams of acetic anhydride cooled by means of an ice bath and was added slowly to the rapidly agitated mercuric oxide solution. Twenty grams of acetic anhydride was then poured into the reaction mixture and finally 8 grams of fuming sulfuric acid was added drop by drop. The reaction mixture was then cooled to 14° C. and 310 grams of monovinylacetylene was added as liquid to the rapidly agitated reaction mixture during the course of 4 hours. The reaction temperature was dropped to 5° C. in about half an hour where it was held during the reaction by means of an ice bath. The reaction mixture was poured into water saturated with salt, the water insoluble layer neutralized with ammonium hydroxide and finally washed with saturated salt solution. After drying over calcium chloride the product was fractionated under reduced pressure and 80 grams of crude butadienyl acetate boiling 30–80° C. at 20 mm. was obtained which amounted to a yield of 10.7%, based on the acetic acid used. Refractionation of the crude butadienyl acetate yielded 43 g. boiling 33–40° C. at 20 mm. Sixty-four grams of resin was isolated from the reaction mixture. The resin was soluble in acetic acid but became substantially insoluble in all solvents when heated.

*Example 3—Preparation of 1,3-butadienyl-2-chloracetate*

Five moles of chloracetic acid and 10 grams of mercuric phosphate were placed in a 3-neck flask equipped with a stirrer, reflux condenser, and inlet tube leading to the bottom. The reaction mixture was then vigorously stirred while 4 moles of monovinylacetylene was bubbled in as gas during 5 hours. Three grams of catalyst were added after the first, second and third hour. The temperature dropped slowly from 71° C. at the start to 57° C. at the end of the reaction. Three moles of the monovinylacetylene were absorbed. The reaction mixture was distilled rapidly at 15 mm. until only chloracetic acid distilled. The distillate was chilled with ice and the chloracetic acid which crystallized was filtered off. The filtrate was washed with water and with dilute ammonium hydroxide until neutral. After drying over calcium chloride the material was redistilled several times and finally 5 grams was obtained which boiled constantly at 51°–53° C. at 2 mm. The yield was about 1% based on the acid used. A large amount of the ester was converted to polymer during the reaction and subsequent distillations.

*Example 4.—Preparation of 1,3-butadienyl-2-formate*

Two hundred thirty g. (5 moles) of dry formic acid and 230 g. of gasoline which boiled at 50°–90° C. at 10 mm. were placed in a three necked flask equipped as described in Example 3. Twenty-three grams of mercuric phosphate were used as the catalyst; ten grams were added at the start, 8 grams after the first hour and 5 grams after the second hour. The reaction mixture was vigorously agitated and 208 grams (4 moles) of monovinylacetylene as gas was allowed to bubble into the reaction mixture during 4.5 hours. The temperature was maintained at about 50° C. During the reaction, 149 grams of monovinylacetylene was absorbed. Hydroquinone was added to the reaction mixture and it was distilled at 100 mm. The portion distilling below 100° C. at this pressure was collected. The distillate separated into two layers. The upper layer proved to be only the aliphatic diluent that was used in the reaction. The lower layer was neutralized and salted out with a potassium carbonate solution. After drying over potassium carbonate the liquid was refractionated a number of times over hydroquinone and finally 21 grams boiling 48–49° C. at 31 mm. was isolated. This amounted to a yield of 4%. An appreciable quantity of resin formed during the reaction and during distillation of the product.

*Example 5.—Preparation of 1,3-butadienyl-2-butyrate*

Three hundred fifty-two grams of butyric acid, 17.6 grams of mercuric oxide, 7.8 grams of fuming sulfuric acid, 17.6 grams of sulfo-acetic acid, 17.6 grams of acetic anhydride were placed in a three neck flask equipped as described in Example 3. The mixture was rapidly stirred and the temperature was maintained at 50–55° C. during the reaction. Two hundred eight grams of monovinylacetylene as gas was bubbled into the reaction mixture during 4 hours. One hundred seventy-three grams of the monovinylacetylene was absorbed during the reaction. The reaction mixture was distilled under reduced pressure and the distillate was washed and neutralized with a saturated potassium carbonate solution. The liquid was dried over anhydrous potassium carbonate and refractionated a number of times over hydroquinone. Twelve grams of liquid was obtained which boiled 59–60° C. at 11 mm. A large amount of the ester polymerized during the reaction and during purification.

The butadienyl esters are made by catalytically reacting monovinylacetylene either as gas or liquid with an organic acid which is preferably in the liquid state, i. e., the acid is either normally liquid or if it is normally a solid it is dissolved in a suitable solvent. The concentration of acid is not critical, although fairly high concentrations are preferable. Butadienyl acetate is made, for example, by adding with rapid stirring one mole of liquid monovinylacetylene to one mole of acetic acid containing a mercuric salt, preferably mercuric sulfate. Temperatures ranging from −50° C. to +100° C. can be employed. At −50° C. the yield of crude butadienyl acetate based on the acetic acid used is 2.5% while at 0° or 25° C. the yield is about 20%. When the condensation of monovinylacetylene with acetic acid is carried out at 50° C. about 9% of butadienyl acetate and 9% of a diacetate of butenediol are obtained. A non-reactive diluent, such as an aliphatic hydrocarbon, can be used for better control of the reaction. For example, when a high boiling gasoline is used as a diluent at 50° C. an 8% yield of crude butadienyl acetate is obtained and no higher boiling unsaturated material is formed.

The proportions of monovinylacetylene and organic acid can vary considerably above and below equimolecular proportions, although approximately equimolecular proportions are preferred. As illustrating the use of an excess of monovinylacetylene, when one mole of acetic acid containing mercuric sulfate as a catalyst is introduced into three moles of monovinylacetylene a 2% yield of butadienyl acetate is obtained.

Rapid stirring is preferred during the ester-forming reaction, but merely shaking the reactants with a catalyst in a closed system gives good results.

The preferred catalyst mixture consists of mercuric sulfate, sulfo-acetic acid, and acetic anhydride. Under comparable conditions a 10% yield of butadienyl acetate is obtained with this catalyst mixture while with mercuric sulfate alone a yield of 3.5% is obtained. Benzene sulfonic acid can be substituted for sulfo-acetic acid in the catalyst mixture. Ferric sulfate, copper sulfate or other oxidizing agents such as vanadates, chromates, manganates, etc., can also be used in the catalyst for the reaction in admixture with mercuric sulfate or in admixture with other suitable catalytic mercury salts. Mercury salts other than mercuric sulfate can also be used, for example, a 4% yield of butadienyl formate is obtained from formic acid and monovinylacetylene with mercuric phosphate as a catalyst. Other mercuric salts in which the mercury atom is directly attached to oxygen, e. g., mercuric nitrate, mercuric benzene sulfonate, mercuric sulfo-acetate, etc., or other mercuric salts of non-carboxylic acids may be used. Mercuric salts in which the mercury is linked directly to carboxyl, e. g., the acetate are not highly efficient catalysts. Boron trifluoride is a catalyst for the condensation. In one case its use led to the formation from monovinylacetlyene and acetic acid of 6% of butadienol acetate and 15% of a diacetate of butenediol. Alkali metal bisulfates, e. g., potassium bisulfate may also be added to the mercury catalyst mixture. The proportions of the catalysts in the mixture can be varied from those disclosed in the examples, but the presence of too great an amount of catalyst results in the formation of polymers of the formed esters. Thus, twice the usual quantities of catalysts have been used and have resulted in most of the product being converted directly to resin.

The quantity of resin obtained as a by-product amounts to 6% at −50° C. and to 11.5% at 50° C. If it is desired to obtain a large yield of resin the reaction mixture can be heated at 50°–100° C. in an open or closed container for several hours at the end of which time little distillable material remains. If desired, an antioxidant, like hydroquinone, may be included in the reaction mixture to suppress polymerization. The resin can be isolated from the reaction mixture or from its solutions by precipitation with alcohol or by removal of the solvent by distillation.

The unpolymerized esters may be recovered in a number of ways from the reaction mixture. They can be distilled directly from the reaction mixture, preferably under reduced pressure, or the product can be separated from the resin by a steam distillation or a combined vacuum-steam distillation. The reaction mixture can be poured into water, the water insoluble liquid removed and distilled. An antioxidant such as hydroquinone or pyrogallic acid can be used during the distillations. The preferred procedure for isolating the unpolymerized esters of the lower molecular weight fatty acids consists in (a) separating the water insoluble oily material by washing the reaction mixture with water saturated with sodium chloride, (b) neutralizing the unreacted organic acid in the water insoluble material with ammonium hydroxide, (c) washing out any excess of ammonium hydroxide with water saturated with sodium chloride, (d) drying with calcium chloride or some other drying agent, and (e) fractionating under reduced pressure.

The boiling range, 38°–40° C., at 20 mm. of the butadienyl acetate indicates it to be a mono-ester since the diacetates of butenediol that are described in the literature all boil above 100° C. at 20 mm. When butadienyl acetate is heated with aqueous sodium hydroxide solution, practically all the material is converted to a brittle, thermoplastic, water-insoluble resin. No methyl vinyl ketone, the tautomer of 1,3-butadienol-2, can be detected in the distillate secured upon distillation of the hydrolysis mixture with steam. On the other hand, the hydrolysis of butadienyl acetate with dilute hydrochloric or sulfuric acids yields, in addition to a soft, water-insoluble resin, a product which distills with steam. This product may be converted to a solid pyrazoline derivative by reaction with phenyl hydrazine. It melts at 75°–76° C., the melting point of the same derivative of methyl vinyl ketone. Analytical results obtained for this pyrazoline are carbon 73.7%, hydrogen 7.6%; calculated for methyl-3-phenyl-1 pyrazoline, carbon 75%, hydrogen 7.5%. This evidence indicates that the acetate radical is attached to the second carbon atom in butadiene. The physical constants and analytical data for some of the butadienyl esters are given in the appended table.

The organic esters of butadienol may be made by both static and continuous flow processes, under increased pressure or under reduced pressure and at temperatures ranging from −50° to +100° C. At the lower temperature the reaction goes very slowly while at the higher temperature polymerization takes place almost exclusively. Higher temperatures also favor formation of diesters of butenediol.

*Physical constants and analytical data for some butadienyl esters*

| Butadienyl ester | Boiling point | | Sp. G. | Refractive index | Molecular refractivity | | Analyses | | | | | | Mol. wt. (in freezing benzene) | |
|---|---|---|---|---|---|---|---|---|---|---|---|---|---|---|
| | | | | | | | Carbon | | Hydrogen | | Chlorine | | | |
| | °C. | mm. | $d_{20}^{20}$ | $n_D^{20}$ | $M_D$ Calc'd* | Found | Calc'd* | Found | Calc'd* | Found | Calc'd* | Found | Calc'd* | Found |
| Formate | 48–49 | 51 | 0.9760 | 1.4539 | 26.2 | 27.2 | 61.2 | 62.9 | 6.1 | 6.7 | | | 98 | 94 |
| Acetate | 52–54 | 40 | 0.9658 | 1.4433 | 30.8 | 30.7 | 64.3 | 62.8 | 7.1 | 7.2 | | | 112 | 109 |
| Chloracetate | 51–53 | 2 | 1.1695 | 1.4783 | 35.7 | 35.4 | | | | | 24.2 | 24.9 | | |
| Butyrate | 59–60 | 11 | 0.9369 | 1.4418 | 39.9 | 39.5 | 68.6 | 66.6 | 8.6 | 8.9 | | | 140 | 138 |

*Calculated for mono-ester; calculated for di-acetate C, 55.8; H, 6.97; M.W., 172; calculated for di-butyrate C, 63.2; H, 8.77; M.W., 228.

The above description and specific examples have dealt particularly with the production of 1,3-butadienyl-2 esters of monobasic aliphatic carboxylic acids. However, the scope of the invention includes the production of 1,3-butadienyl-2 esters of organic carboxylic acids generally. Thus, by way of illustration, ester addition products may be formed by the interaction of vinylacetylene and the following acids: formic, acetic, propionic, butyric, caproic, caprylic, oleic, stearic, chloroacetic, bromoacetic, lactic, maleic, sulfo-acetic, acrylic, citric, phthalic, benzoic, naphthoic, and linoleic.

The above described process has been described in connection with the addition products of organic carboxylic acids to vinylacetylene. However, it may likewise be applied to the formation of esters under the same general reaction conditions by the addition of organic acid to the following compounds which may be used in lieu of vinylacetylene:

(1) Vinyl acetylides of the general formula

in which R represents an organic radical, e. g., alkyl or aryl. These compounds and their methods of preparation are disclosed in Carothers and Jacobson Application Serial No. 574,359, filed November 11, 1931, one method of preparation comprising the interaction of vinylacetylene with sodamide, the resulting sodium vinyl acetylide being then reacted with an alkyl chloride to produce the alkyl or aryl vinyl acetylide.

(2) Vinylacetylenes having the general formula

in which R is an organic radical, e. g., alkyl or aryl. These compounds and their method of preparation are disclosed in Carothers and Coffman Application Serial No. 569,832, filed October 19, 1931, one method of preparation comprising the interaction of an aliphatic or aromatic aldehyde or ketone, acetylene and sodamide, then catalytically dehydrating the formed carbinol by passing over a dehydrating catalyst at about 50° C.

Vinylacetylene and its derivatives suitable for use in the present invention correspond to the formula:

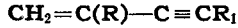

in which R and $R_1$ are hydrogen or organic radicals.

The organic esters of butadienol polymerize spontaneously although polymerization is accelerated by heat, pressure, light, and by catalysts such as mineral acids, alkalies, organic peroxides, inorganic peroxides, ozonized turpentine or stannic chloride. Polymerization also takes place in the presence of mineral acids, alkalies or monobasic acids under the influence of heat or pressure. Heat for example has a marked effect on the rate of polymerization of butadienyl acetate. In a solution containing equal parts of the ester and an aromatic hydrocarbon, 7.5% polymerization is obtained in 4 days at room temperature or in 1 hour at 100° C. as compared with 37% polymerization secured in 1 hour at 145° C. The formate, chloracetate, and butyrate esters polymerize slowly at room temperature; when heated at 100° C. with benzoyl peroxide for an hour they become very viscous. Benzoyl peroxide catalyzes polymerization at room temperature; at 100° C. the catalytic effect is even more marked (72% polymerization of butadienyl acetate in one hour). Stannic chloride catalyzes polymerization of the esters at room temperature to yield dark colored resins. When butadienyl acetate is heated with aqueous alkali a hard, brittle resin which melts without decomposition is obtained; when heated with dilute hydrochloric or sulfuric acids soft, water-insoluble resins are formed. Sunlight accelerates the rate of polymerization of the esters. When uranyl nitrate is present during exposure to sunlight 89% polymerization of butadienyl acetate is obtained in one week. Pressure has a marked effect on the rate of polymerization. For example, butadienyl acetate containing an antioxidant such as pyrogallol yields 72% of rubber-like polymer when subjected to a pressure of 5000 atmospheres for 17.5 hours at 57° C.

1-3-butadienyl-2 acetate and the other corresponding esters polymerize readily when heated in solutions such as in acetic acid or in toluene. The polymer can be isolated by precipitation with alcohol or by removal of the solvent under reduced pressure. Polymerization can be effected in the presence of a solvent for both the monomeric ester and the polymer, such as acetic acid, and in the presence of an inert solvent for the unpolymerized material which is a non-solvent for the polymer such as alcohol. Polymerization takes place in the presence of an inert solvent for the original material and the polymer such as gasoline, in the presence of a polymerizable solvent like vinyl acetate or polymerizable non-solvent like methylol urea, or in the presence of an inert-non-solvent such as a suspension in water, or in the presence of a polymerizable solvent like 2-chlor-butadiene-1,3 suspended in an inert-non-solvent like water.

Aqueous emulsions of butadienyl acetate can be made with sodium oleate which, on evaporation, give films of latex-like material. Other emulsifying agents may be used in place of sodium oleate, such as the ammonium or alkali metal salts of organic acids of high molecular weight, for example of the higher fatty acids, of resin acids such as abietic acid, or aromatic sulfonic acids, such as those obtained by the reaction of naphthalene, acetone, and sulfuric acid, and of complex acids, such as those formed by partial esterification of dibasic acids with polyhydric alcohols which are themselves partly esterified with monobasic acids. Salts of these acids with metals, other than the alkaline metals, may also be used in some cases. The organic esters of butadienol may be emulsified in acetic acid containing casein or to the emulsions, made with sodium oleate for example, casein may be added before acidifying with acetic acid.

The butadienyl esters when exposed to even a small amount of air polymerize at room temperature to form rubber-like polymers in ten days to two weeks time. Blanketing with oxygen-free gases such as carbon dioxide or nitrogen, and introducing small amounts of antioxidants all retard polymerization. Examples of such antioxidants include phenolic compounds like hydroquinone and pyrogallic acid, halogens such as iodine or bromine, nitro compounds like trinitrobenzene, amines like phenyl beta naphthylamine, and sulfur and sulfur compounds such as mercaptans and thiocarbamates. The rate of polymerization of the esters may be retarded by the presence of compounds containing activated double bonds adjacent to carbonyl groups such as benzoquinone, naphthoquinone, maleic and fumaric acids, maleic and fumaric anhydrides, maleic and fumaric esters, methyl vinyl ketone which compounds are capable of reacting with the unpolymerized esters.

Polymerization of the esters either alone, or in solutions or suspensions can be effected in the presence of drying oils, such as linseed or China-wood oil or their acids, in the presence of semi-drying oils, such as olive and castor oils or their acids, and mineral oils such as liquid petrolatum. Polymerization of the esters can be carried out in the presence of natural resins such as Congo, damar, kauri, rosin, ester gum or shellac or in the presence of cellulose derivatives such as cellulose nitrate, cellulose acetate or ethyl cellulose, and in the presence of synthetic resins, for example, phenol formaldehyde, glyptal, urea formaldehyde, styrene, and vinyl resins. Polymerization can be carried out in the presence of softeners or plasticizers such as camphor, glycerol, benzyl phthalate, aryl phosphates, alkyl phthalates, and vaseline.

The organic esters of butadienol form three types of rubber-like polymers, depending on their method of preparation. These types may be designated resin polymer, rubber polymer and latex polymer. The resin polymer is the soluble polymer which results when the esters are polymerized in solutions, polymerization being stopped before the insoluble stage is reached. Their solutions give clear homogeneous films when the solvent evaporates. The rubber or less soluble polymer is formed when the esters polymerize in the absence of a solvent or when polymerization is carried out in a solvent until the polymer becomes insoluble. The latex polymer is formed when polymerization is carried out in emulsions. The resin polymer is probably converted to the rubber polymer on further polymerization. The latex polymer resembles vulcanized natural rubber. Both the resin and the rubber polymers may under certain circumstances be converted to a material resembling vulcanized natural rubber.

Butadienyl esters when heated in the absence of a solvent or when let stand at room temperature for several weeks form a material which resembles rubber, and which toughens on aging. The rubber polymers of the chloracetate ester are tougher and more elastic than those of the acetate and formate esters. Solutions of the resin polymer of the acetate give clear, colorless films which do not wrinkle while drying and are soft and flexible. The films discolor only slightly when exposed to ultraviolet light for 12 hours or to sunlight for several days. Films of the acetate resin polymer made at 145° C. dry tack free in two to three hours. The resin polymer of the acetate is compatible in mixtures with pyroxylin in equal proportions but only to a limited extent with cellulose acetate, polyvinyl acetate, linseed or China wood oils. The resin polymer of the formate ester is insoluble in toluene, differing in this respect from the acetate and chloracetate esters. Films of the resin polymer of the formate dry more rapidly (tack-free in 30 minutes) than those of the acetate or chloracetate polymers. The latex polymer of the esters, for example, of the acetate, formed by emulsifying with water resembles a vulcanized natural rubber in being somewhat elastic.

The polymers, interpolymers, and cross polymers of the esters may be employed in coating or impregnating compositions for wood, stone, leather, cloth, paper, metal, rubber, glass, and synthetic resins. They may be used as clear finishes or with pigments in enamels. The polymers may be mixed with wood flour, ground cork or mineral filler for use in plastics. They may be used in laminated products as a binder for sheets of cellulose acetate, pyroxylin, or glass. The polymers may be used as adhesives for wood, stone, leather, cloth, paper, metal, rubber, glass, or regenerated cellulose film. Films of the latex polymer may be formed by flowing, dipping or electrodeposition, or the latex may be extruded into a coagulating bath to form sheets or fibers. The polymers may be used in compositions representing combinations with cellulose derivatives such as cellulose nitrate, the natural gums or resins, with synthetic resins, with softeners or plasticizers, with pigments, bituminous materials, with oils such as the drying and semi-drying oils, with antioxidants, and with dyes.

The above description and examples are illustrative only and are not to be construed as limiting the scope of the invention. Any modification or variation therefrom which conforms to the spirit of the invention is to be included within the scope of the claims.

I claim:

1. As new chemical compounds, the addition products of an organic carboxylic acid and a compound having the formula $$CH_2=CR-C\equiv CR_1$$

in which R and $R_1$ are hydrogen or organic radicals.

2. As new chemical compounds, the 1,3-butadienyl-2 esters of organic carboxylic acids.

3. As new chemical compounds, the 1,3-butadienyl-2 esters of aliphatic carboxylic acids.

4. As new chemical compounds, the 1,3-butadienyl-2 esters of saturated monobasic aliphatic carboxylic acids.

5. As new chemical compounds, the polymers of the addition products of an organic carboxylic acid and a compound having the formula $$CH_2=CR-C\equiv CR_1$$

in which R and $R_1$ are hydrogen or organic radicals.

6. As a new chemical compound, 1,3-butadienyl-2-acetate.

7. As new compositions of matter, the polymers of the 1,3-butadienyl-2 esters of organic carboxylic acids.

8. As new compositions of matter, the polymers of the 1,3-butadienyl-2 esters of aliphatic carboxylic acids.

9. As new compositions of matter, the polymers of the 1,3-butadienyl-2 esters of saturated monobasic aliphatic carboxylic acids.

10. As new compositions of matter, the polymers of 1,3-butadienyl-2-acetate.

11. The process of forming esters which comprises reacting an organic carboxylic acid and a compound having the formula $$CH_2=CR-C\equiv CR_1$$

in which R and $R_1$ are hydrogen or organic radicals.

12. The process of forming esters which comprises reacting vinylacetylene and an organic carboxylic acid.

13. The process of forming esters which comprises reacting vinylacetylene with aliphatic carboxylic acids.

14. The process of forming esters which comprises reacting vinaylacetylene with saturated monobasic aliphatic carboxylic acids.

15. The process of forming esters which comprises reacting vinylacetylene with acetic acid.

16. The process of forming esters which comprises reacting vinylacetylene with saturated monobasic aliphatic carboxylic acids in the liquid state.

17. The process of forming esters which comprises reacting vinylacetylene with saturated monobasic aliphatic carboxylic acids in the presence of a catalyst for the reaction.

18. The process of forming esters which comprises reacting vinylacetylene with saturated monobasic aliphatic carboxylic acids in the liquid state, said catalyst containing a member of the group consisting of mercuric sulfate, mercuric phosphate, mercuric sulfo-acetate, mercuric benzene-sulfonate, and boron trifluoride.

19. The process of forming esters which comprises reacting vinylacetylene with saturated monobasic aliphatic carboxylic acids in the liquid state, said catalyst comprising essentially mercuric sulfate and a member of the group consisting of sulfo-acetic acid and benzene sulfonic acid.

20. The process which comprises commingling vinylacetylene, glacial acetic acid and mercuric sulfate, agitating the mixture and removing the formed 1,3-butadienyl-2 acetate from the reaction mixture.

21. The process which comprises polymerizing an addition product of an organic carboxylic acid and a compound having the formula $$CH_2=CR-C\equiv CR_1$$

in which R and $R_1$ are hydrogen or organic radicals.

22. The process which comprises polymerizing a 1,3-butadienyl-2 ester of an organic carboxylic acid.

23. The process which comprises polymerizing a 1,3-butadienyl-2 ester of an aliphatic carboxylic acid.

24. The process which comprises polymerizing a 1,3-butadienyl-2 ester of a saturated monobasic aliphatic carboxylic acid.

JAMES H. WERNTZ.